United States Patent [19]

Fujino et al.

[11] Patent Number: 4,480,903
[45] Date of Patent: Nov. 6, 1984

[54] CAMERA CAPABLE OF SWITCHING BETWEEN MANUAL EXPOSURE CONTROL AND SHUTTER PRIORITY AUTOMATIC EXPOSURE CONTROL

[75] Inventors: Masahisa Fujino; Akio Sunouchi, both of Tokyo; Tatsuo Konno; Ryuji Suzuki, both of Kanagawa, all of Japan

[73] Assignee: Canon Kabushiki Kaisha, Tokyo, Japan

[21] Appl. No.: 366,483

[22] Filed: Apr. 8, 1982

[30] Foreign Application Priority Data

Apr. 14, 1981 [JP] Japan .................................. 56-55761

[51] Int. Cl.³ .............................................. G03B 7/08
[52] U.S. Cl. .................................. 354/465; 354/289.1
[58] Field of Search .................... 354/53, 54, 55, 56, 354/57, 61, 465, 442, 289.1

[56] References Cited

U.S. PATENT DOCUMENTS

| | | | |
|---|---|---|---|
| 3,002,436 | 10/1961 | Bihlmaier | 354/57 |
| 3,083,626 | 4/1963 | Nerwin | 354/57 |
| 4,037,235 | 7/1977 | Veda | 354/57 |
| 4,051,503 | 9/1977 | Uno et al. | 354/57 |
| 4,087,829 | 5/1978 | Veda et al. | 354/53 |
| 4,101,911 | 7/1978 | Maitani et al. | 354/57 |

Primary Examiner—Michael L. Gellner
Attorney, Agent, or Firm—Toren, McGeady and Stanger

[57] ABSTRACT

The disclosed camera includes a viewfinder which displays a display member representing a preset aperture value in its view field, and is capable of operating in open aperture and stopped down aperture manual exposure modes as well as a shutter priority automatic exposure control mode. A retracting arrangement retracts the display member from the view field in response to a shift either to the stopped down or the shutter priority automatic exposure control mode.

6 Claims, 3 Drawing Figures

CAMERA CAPABLE OF SWITCHING BETWEEN MANUAL EXPOSURE CONTROL AND SHUTTER PRIORITY AUTOMATIC EXPOSURE CONTROL

BACKGROUND OF THE INVENTION

1. Field of the Invention

This invention relates to cameras selectively capable of manual exposure control mode and shutter priority automatic exposure control mode (hereinafter referred to as "TV-AE" mode), and more particularly to a single lens reflex cameras with the aperture value display being made to be presented by using an exposure meter pointer and a follow-up mark in the finder.

2. Description of the Prior Art

With the single lens reflex camera when switched to the manual exposure control mode, two light metering aspects becomes possible, one of which operates at the full open aperture of the diaphragm in the used interchangeable lens mounting, and another aspect which operates with the stopping down to a desired aperture value. The photographer has the choice of these two aspects and will determine which one of the aspects is to be used depending upon his aim to shoot. Hereinbelow these light metering aspects will be described in.

The aforesaid light metering-at-open aperture aspect is a system in which a follow-up mark representing the actual aperture value of the diaphragm in the photographic objective lens mounting attached to the camera is manually adjusted to coincidence with a meter pointer of which the deflected position represents a correct exposure, i.e., aperture value, thereby the correct exposure is obtained. On the other hand, the aforesaid light metering-at-preset aperture aspect is a system in which, whilst the objective lens is stopped down manually, the meter pointer which is left to appear in the field of view of the finder is placed in registry with a null point by turning the shutter dial or the diaphragm ring, thereby the correct exposure is obtained. It is to be noted here that, in the latter system, the follow-up mark is taken out of the field of view of the finder.

When such manual exposure control camera having the aforesaid follow-up mark operatively connected to the diaphragm mechanism is made to have built therein a shutter priority automatic exposure control mechanism, it can be said in common to both the aforesaid light metering aspects that the information display in the finder becomes very annoying, since the follow-up mark is caused to move from the start position of the adjustment of the diaphragm in the objective lens to a setting position for the correct exposure in response to the diaphragm adjusting operation of the objective lens each time a shutter release operation is carried out. Further, the use of a motor drive or auto-winder on the camera leads to move the follow-up mark vibrationally as the camera operates at a high speed, thereby giving rise to a problem of shortening the life-time.

SUMMARY OF THE INVENTION

An object of the present invention is to provide a camera which has overcome the above-described drawbacks of the conventional camera.

Another object of the present invention is to provide a camera of simple form, while still permitting the above-described drawbacks of the conventional camera to be eliminated.

These and other objects of the invention will becomes apparent from the following detailed description of an embodiment thereof.

DESCRIPTION OF THE PREFERRED EMBODIMENT

Figure 1:
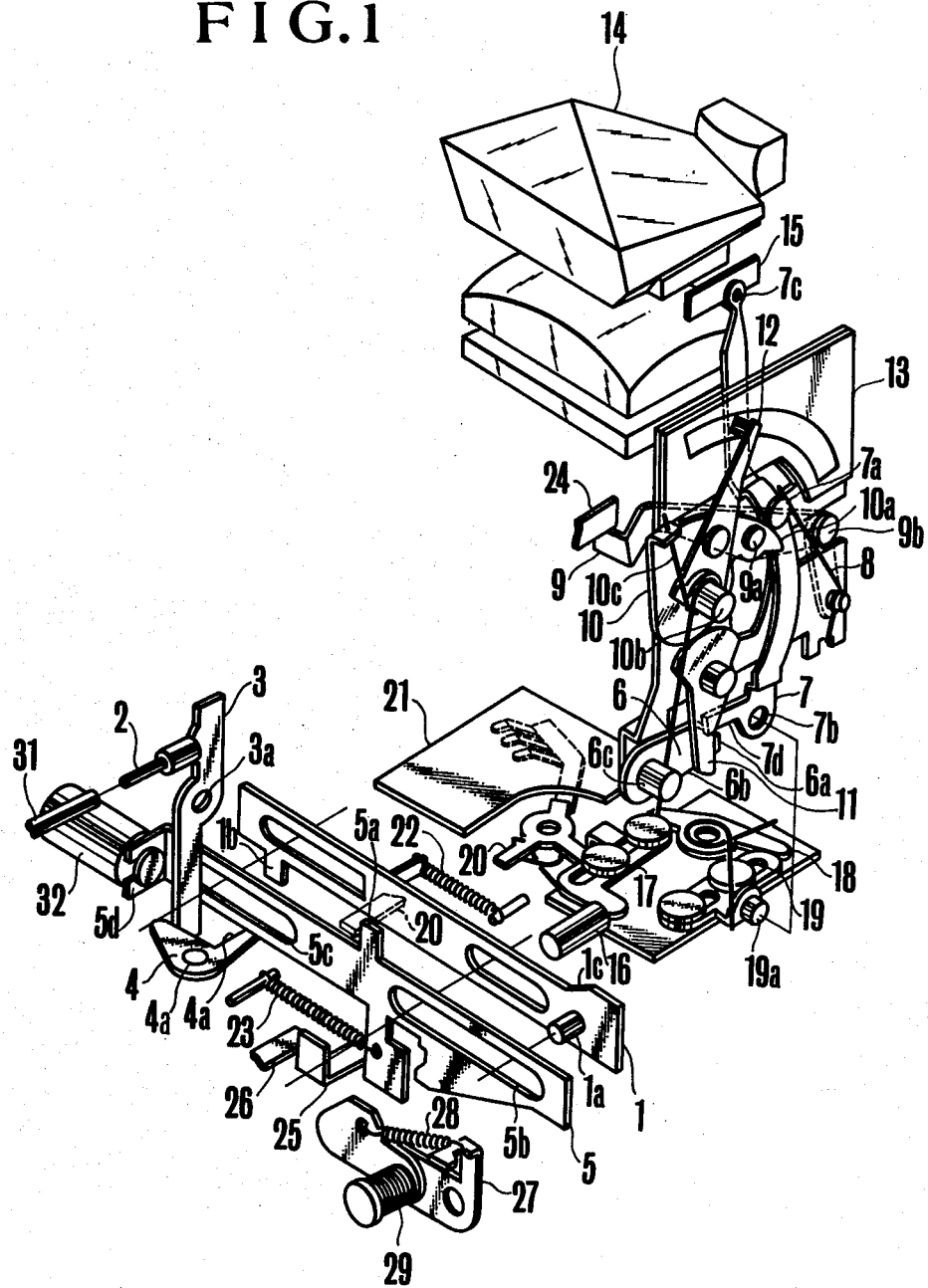
FIG. 1 is an exploded perspective view of an embodiment of a camera in accordance with the present invention.

FIG. 1 in exploded perspective view illustrates an embodiment of a camera capable of changing over between the manual exposure control and TV-AE modes according to the present invention. When the camera is switched from the light metering at open aperture and manual exposure control mode to the light metering at closed down aperture and TV-AE mode, the display in the finder of the camera of FIG. 1 is changed from the position of FIG. 2 to the position of FIG. 3. A switching mechanism in FIG. 1 is assumed to be in an operative position for the light metering at open aperture and manual exposure control mode.

Figure 2:
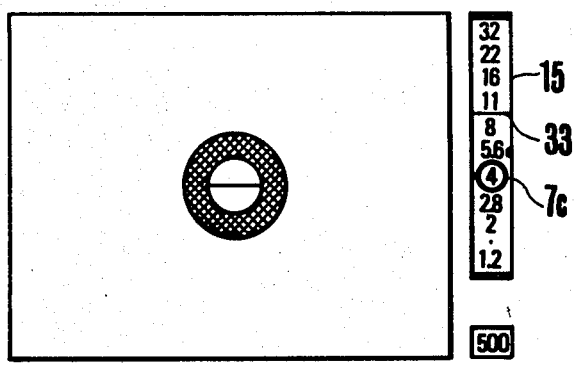
FIGS. 2 and 3 are plan views of a display near the field of view of the finder of FIG. 1 with FIG. 2 illustrating a position for the light metering at open aperture and manual exposure control mode, and FIG. 3 illustrating another position for the light metering at closed down aperture and TV-AE mode.
Figure 3:
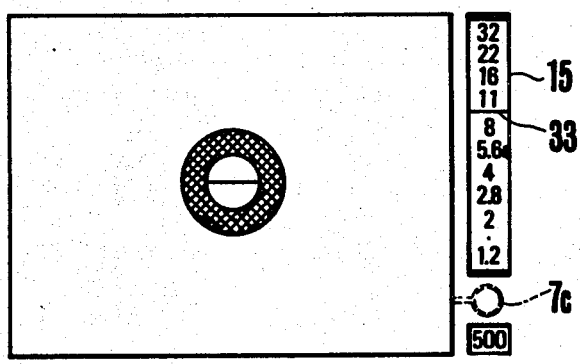

In the drawings, 1 is a follow-up mark retracting slide plate having a pin 1a engageable with an end portion of an elongated slot 5b in a diaphragm closing down slide plate 5 and a downward extension 1b and arranged to move the follow-up mark lever 7 to a position outside a window for an aperture scale 15 near the field of view of the finder known to those skill in the art illustrated in FIGS. 2 and 3 either when the diaphragm is closed down as the diaphragm closing down slide plate 5 is actuated, or when the exposure is changed over to the TV-AE as auto-and-manual changeover pins 31 and 2 are actuated; 2 is an auto-and-manual changeover pin arranged upon abutting engagement with a lens-side auto-and-manual changeover pin 31 to transfer action of the pin 31 to the camera side; 3 is an auto-and-manual changeover lever upon abutting engagement of the pin 2 to turn about a pivot pin 3a; 4 is an intermediate lever engaging at its one arm with one end of the lever 3 and pivotally mounted at a pin 4a to turn in a counterclockwise direction as the lever 3 turns clockwise; 5 is a diaphragm closing down slide plate having an upward extension 5a, elongated slots 5b and 5c and a bent portion 5d and arranged to move an automatic diaphragm lever 26 to a diaphragm closed down position by the bias force of a spring 23, whereby said upward extension 5a of the slide plate 5 engages one end of an aperture opening correction lever 20 at the time of diaphragm closing down operation to change over a light metering and an exposure value computing circuit (not shown) to the light metering at closed down aperture mode; 6 is a follow-up mark retracting lever having a side edge 6b slidingly abutting on an inclined portion 1c of the slide plate 1 and an upward extension 6a engaging one end 7d of a follow-up mark lever 7 and pivotally mounted on a pin 6c; 7 is a follow-up mark lever having a lobe 7a slidingly abutting on a camming surface 10a of a cam gear 10, a fitted hole 7b, and a tip portion 7c and rotatable about a pin 19a fixed to a follow-up mark holding plate 19; 8 is a follow-up mark spring pressing a lobe 7a of the follow-up mark lever 7 against the camming surface 10a of the cam gear 10 and urging the follow-up mark lever 7 to return from a position outside the viewfield to a display position; 9 is an aperture signal lever pivotally mounted at shafts 9a and 9b and engaging a lens-side aperture signal lever 24, whereby when in the TV-AE mode, said lever controls the lever 24 to adjust the size of aperture opening of a diaphragm (not shown) to a computed value; 10 is a cam gear having a camming surface 10a and rotatably mounted on a shaft 10b with a gear provided on the lower portion of said cam gear 10 meshing with a charge gear 11, and said cam gear 10 rotating in correspondence to the position of the aperture signal lever 24; 10c is a spring urging the cam gear 10 to turn in a counterclockwise direction; 11 is a charge gear for adjusting the aperture signal lever 24 of the lens to a proper aperture value through the cam gear 10 by a control mechanism (not shown) when in TV-AE mode; 12 is an information resistance brush fixed to the cam gear 10 and slidingly movable on a pattern of an information resistance substrate 13 for converting the number of aperture stops of the lens to an electrical signal; 13 is an information resistance substrate for converting the number of aperture stops of the lens to an electrical signal; 14 is a penta prism; 15 is an information display scale plate with aperture values displayed on a transparent film; 16 is a camera side opening correction pin receptive of a mechanical signal representing the opening $F_{NO}$ of the lens side; 17 is a correction slide plate for actuating rotation of an opening correction lever 20 with brushes thereof on an opening correction resistance substrate 21 for converting the opening $F_{NO}$ of the lens to an electrical signal and, at the same time, moving the follow-up mark holding plate 19 which fixedly carries the pivotal shaft of the follow-up mark lever 7 to a corresponding position to the opening $F_{NO}$; 18 is a drive connection lever for transmitting movement of the correction slide plate 17 to the follow-up mark holding plate 19; 19 is a follow-up mark holding plate for moving the shaft of the follow-up mark lever 7 in correspondence to the opening $F_{NO}$ of the lens; 20 is an opening correction lever upon rotation in correspondence to the opening $F_{NO}$ to convert the opening $F_{NO}$ to an electrical signal and when in light metering at closed down aperture, to engage with the upward extension 5a of the diaphragm closing down slide plate 5 and move to the outside of the resistance pattern on the opening correction resistance substrate 21; 21 is an opening correction resistance substrate for converting the opening $F_{NO}$ of the lens to an electrical signal; 22 is a follow-up mark retracting slide plate spring urging the follow-up mark retracting slide plate 1 to a position for the light metering at open aperture and for the manual mode; 23 is a diaphragm closing down spring acting on the diaphragm closing down slide plate 5 to move in a direction to close down in response to releasing operation of an automatic diaphragm opening lock device 27, 28, 29 and 30; 24 is an aperture signal lever of the lens responsive to operation of a diaphragm ring on the lens barrel to move to a position corresponding to the number of stops from the full open aperture to a preset aperture value, whereby the aperture stop number information is transmitted to the camera body side, and also capable of controlling the diaphragm of the lens from the camera body side; 25 is an automatic diaphragm lever responsive to release operation to move an automatic diaphragm lever 26 of the lens to a diaphragm closed down position and after the completion of running down movement of a shutter, to automatically return to the full open position, said lever 25 being capable of moving the automatic diaphragm lever 26 to the closed down position by manual diaphragm closing down operation; 26 is an automatic diaphragm lever for closing down the diaphragm of the lens from the full open position to a preset aperture value; 27, 28, 29 and 30 are parts constituting an automatic diaphragm opening lock device known to those skilled in the art operating in such a manner that upon once depression of a diaphragm closing down button 32 fixed to the bent portion 5d of the diaphragm closing down slide plate 5 from the light metering at open aperture position, the diaphragm closing down slide plate 5 is released from locking connection, and at the same time the diaphragm closing down button 32 is moved to a more projected position for light metering at closed down aperture than the above-described position, and then upon once more depression of the diaphragm closing down button 32 from the projected position for the light metering at open aperture further deeper downwards, it is locked again in the above-described position; 31 is an auto-and-manual changeover pin for transmitting whether the lens is in the TV-AE mode or the manual exposure control mode depending upon its projected amount to the camera body side; 32 is a diaphragm closing down button for performing changing over operation between the light meterings at open aperture, and at closed down aperture; 33 is a meter pointer known to those skilled in the art of which the reading represents a proper aperture value as a function of the various exposure factors such as object brightness, film speed and the like. It is noted that the camera illustrated in FIG. 1 has a TV-AE mechanism known to those skilled in the art.

The operation of the camera of FIG. 1 is as follows: In the case of the light metering at open aperture and the manual exposure control mode, when the objective lens (not shown) is attached to the camera body, the opening signal pin 16 is pushed to a length depending upon the aperture opening $F_{NO}$ signal from the lens, thereby the slide plate 17 is moved to the right and the lever 18 is turned in clockwise direction. Therefore, the holding plate 19 engaging the lever 18 is moved to the left, causing the pin 19a that is the center of rotation of the follow-up lever 7 to be moved to a position corresponding to the aperture opening $F_{NO}$. Also when a diaphragm ring (not shown) on the lens barrel is turned to a desired aperture value, the aperture signal lever 24 cooperating with the diaphragm ring moves the lever 9, and the cam gear 10 which is arranged to move as a unit with the lever 9 by the pin 9a is turned clockwise by an angular distance depending upon the above-described number of stops between the full open and the preset aperture value. At this time, the follow-up mark lever 7 follows up movement of the cam gear 10. As a result, the aperture opening $F_{NO}$ of the lens as the position of the pivot pin 19a of the follow-up mark lever 7 and the stop number signal from the full open aperture $F_{NO}$ to the preset aperture value as the position of the pin 7a of the follow-up mark lever are given to the follow-up mark lever 7 so that these signals are added mechanically in the lever 7. Therefore, the follow-up mark 7c is placed in registry with the one of the graduations on the aperture value scale 15 which represents the desired aperture value set on the lens. Then, the diaphragm closing down button 32 is depressed from the position for the light metering at open aperture to release the automatic diaphragm opening lock device 27, 28, 29 and 30, thereby effecting a changeover to the light metering at closed down aperture, as the diaphragm closing down slide plate 5 is moved to the left under the action of the spring 23. Such movement of the slide plate 5 causes movement of the automatic diaphragm lever 26 to the diaphragm closing down position, and also causes the follow-up mark retracting slide plate 1 to be moved in the same direction through the pin 1a fitted in the slot 5b in the slide plate 5. As the inclined portion 1c of the follow-up mark retracting slide plate 1 then lifts up the follow-up mark retracting lever portion 6b, the same lever 6 is turned about the shaft 6c in the counterclockwise direction. The same lever portion 6a lifts up the follow-up mark lever 7 at its portion 7d against the follow-up spring 8, thereby the follow-up lever 7 is turned about the pin 19a in the clockwise direction. Therefore, the indicator portion 7c of the follow-up mark lever moves to the right out of the viewfield of the finder. Next, in order to regain the light metering at open aperture, the diaphragm closing down button 32 is pushed down from its projected position to the position where the automatic diaphragm opening lock device is rendered lockable. During this time, the follow-up mark retracting slide plate 1 is returned to the light metering at open aperture position as follows up under the action of the follow-up mark retracting slide plate spring 22 on which the power was stored when the diaphragm was closed down. Then, the follow-up mark lever 7 is returned by the follow-up mark lever spring 8 to the position where the pin 7a abuts on the camming surface 10a of the cam gear 10.

Next, when a mode changeover operation of the lens is performed to select the TV-AE mode, the auto-and-manual changeover pin 31 of the lens projects so that the camera side auto-and-manual changeover pin 2 is moved to the right and the auto-and-manual changeover lever 3 is turned in the clockwise direction. Then, the intermediate lever 4 is turned in the counterclockwise direction with its portion 4a pushing the follow-up mark retracting slide plate 1 at its portion 1b to the left, thereby said slide plate 1 is driven to move to the same position when the changeover to the light metering at closed down aperture was made. As a result, in a similar manner to that described in connection with the light metering mode at closed down aperture mode, the follow-up lever 7 retracts from the viewfield of the finder (see FIG. 3). Speaking more, the follow-up lever 7 disappears in the finder viewfield 1, and the operative connection between the lever 7 and the diaphragm mechanism 9 to 13 is cut off. When the TV-AE mode is released, the auto-and-manual changeover pin 31 of the lens returns to the retracted position. Therefore, the follow-up mark retracting slide plate 1, intermediate lever 4 and auto-and-manual changeover lever 3 are returned to the position for the light metering at open aperture and manual exposure control mode by the force stored on the spring 22 of the follow-up mark retracting slide plate 1.

As has been described in greater detail in connection with its embodiment, the present invention is to provide a camera in which, by the utilization of the mechanism for retracting the follow-up mark from the field of view of the finder in automatic response to changeover from the light metering at open aperture to the light metering at closed down aperture when in the manual exposure control mode which has been used from the past, it is made possible even when the camera is switched to the TV-AE mode to retract the follow-up mark similarly from the field of view of the finder and cut off the operative connection between the follow-up mark lever and the diaphragm mechanism, thereby giving an advantage that, when switched to any exposure control mode, as the only information necessary to the selected mode is displayed in the finder, the finder becomes very easy to look through. Not only this, such advantage can be realized without the necessity of using an unduly complicated additional mechanism. Thus, the present invention has achieved a great advance in the art.

What is claimed is:

1. A camera capable of operation in open aperture as well as stopped down aperture manual exposure control modes and a shutter priority automatic exposure control mode, comprising:
    (a) a viewfinder with a view field;
    (b) an aperture display scale plate in the view field;
    (c) a diaphragm mechanism to control a diaphragm;
    (d) a mechanical indicating member coupled with said diaphragm mechanism to indicate aperture information on said scale plate; and
    (e) cut off means operatively coupled with the mechanical indicating member for cutting off the connection between said diaphragm mechanism and said mechanical indicating member in response to changing of said camera to either shutter priority automatic exposure control mode, or stop down manual exposure control mode.

2. A camera according to claim 1, wherein said indicating member includes a follow-up mark for indicating preset aperture values when in light metering at open aperture and manual exposure control modes.

3. A camera according to claim 5, wherein said retracting means is arranged to be operated in response to auto-and-manual changeover operation.

4. A camera according to claim 5, wherein said retracting means is responsive to stop down operation of said camera.

5. A camera capable of operation in stopped down manual exposure control mode and a shutter priority automatic exposure control mode, comprising:
    (a) a viewfinder with a view finder;
    (b) an aperture display scale plate in the view field;
    (c) a diaphragm mechanism to control a diaphragm;
    (d) a mechanical indicating member coupled with said diaphragm mechanism to indicate aperture information on said scale plate;
    (e) cut off means operatively coupled with the mechanical indicating member for cutting off the connection between said diaphragm mechanism and said mechanical indicating member and for retracting said indicating member from the field of view of a finder in response to changing of said camera to either shutter priority automatic exposure control mode, or stopped down manual exposure control mode; and
    (f) retracting means for retracting said indicating member from the field of view of a finder in response to changing of said camera to either shutter priority automatic exposure control mode, or stop down manual exposure control mode.

6. A camera capable of operation in a shutter priority automatic exposure control mode, comprising:
    (a) a viewfinder with a view field;
    (b) an aperture display scale plate in the view field;
    (c) a diaphragm mechanism to control a diaphragm;

(d) a mechanical indicating member coupled with said diaphragm mechanism to indicate an item of aperture information on said scale plate; and
(e) cut off means operatively coupled with the mechanical indicating member for cutting off the connection between said diaphragm mechanism and said mechanical indicating member in said shutter priority automatic exposure control mode.

* * * * *